(12) United States Patent
Hargrove

(10) Patent No.: US 6,791,337 B2
(45) Date of Patent: Sep. 14, 2004

(54) DC ATTENUATION METER

(75) Inventor: Douglas L. Hargrove, Modesto, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/218,799

(22) Filed: Aug. 14, 2002

(65) Prior Publication Data

US 2004/0032267 A1 Feb. 19, 2004

(51) Int. Cl.[7] ............................................. H04B 3/46
(52) U.S. Cl. .................................... 324/543; 324/522
(58) Field of Search ............................... 324/539, 543, 324/95, 522

(56) References Cited

U.S. PATENT DOCUMENTS 3,431,351 A    3/1969  Sennhenn
3,603,846 A *  9/1971  Toth ............................ 361/187
3,781,660 A * 12/1973  Ludt et al. .................... 324/444
5,262,609 A * 11/1993  Nowak et al. ................ 219/109
5,343,236 A    8/1994  Koppe et al.
5,600,255 A *  2/1997  Moore et al. ................. 324/715
6,611,147 B2 * 8/2003  White et al. ................. 324/539

* cited by examiner

Primary Examiner—N. Le
Assistant Examiner—Walter Benson
(74) Attorney, Agent, or Firm—James S. Tak; Alan H. Thompson; Michael C. Staggs

(57) ABSTRACT

A portable, hand-held meter used to measure direct current (DC) attenuation in low impedance electrical signal cables and signal attenuators. A DC voltage is applied to the signal input of the cable and feedback to the control circuit through the signal cable and attenuators. The control circuit adjusts the applied voltage to the cable until the feedback voltage equals the reference voltage. The "units" of applied voltage required at the cable input is the system attenuation value of the cable and attenuators, which makes this meter unique. The meter may be used to calibrate data signal cables, attenuators, and cable-attenuator assemblies.

7 Claims, 1 Drawing Sheet

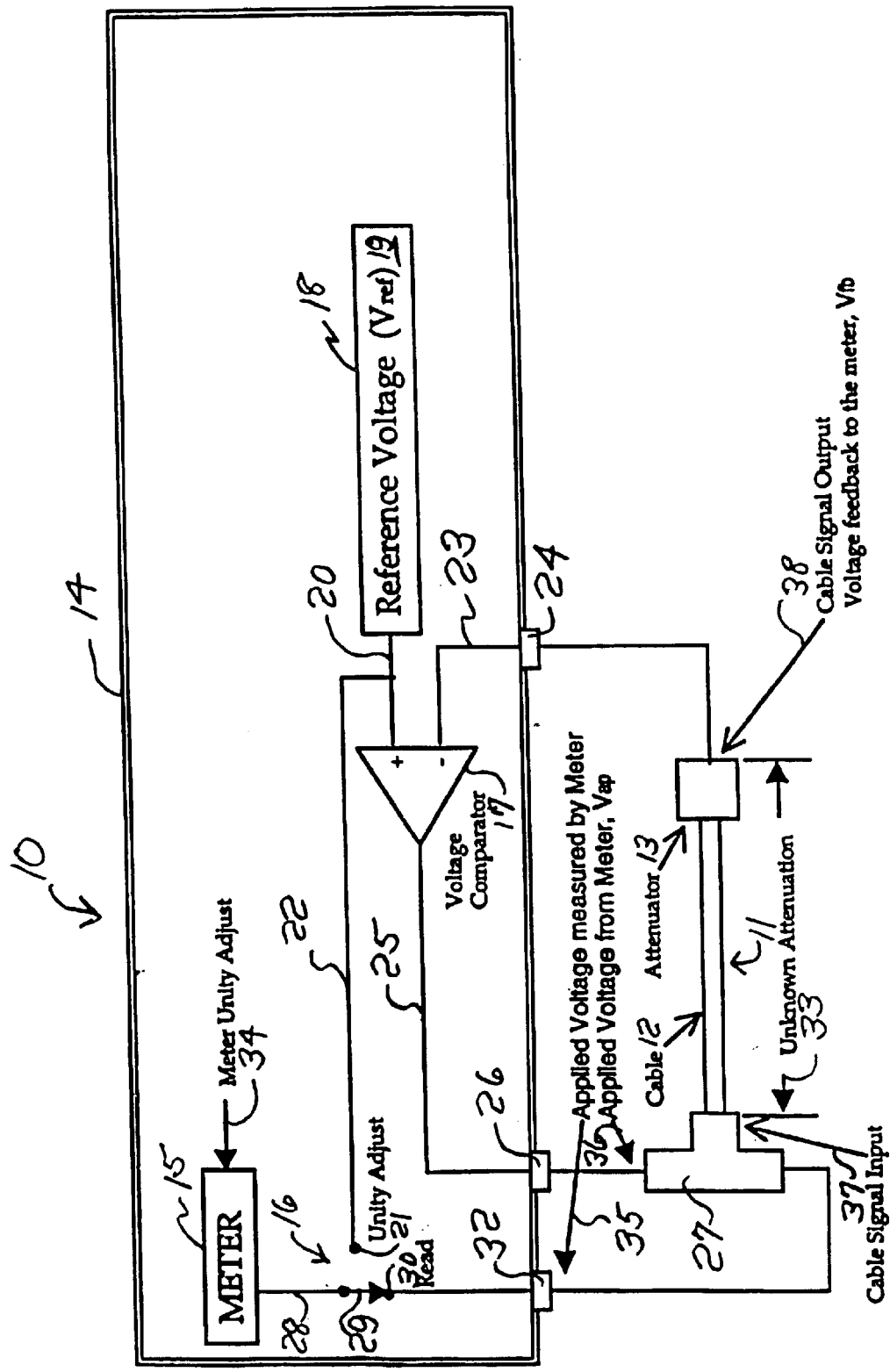

DC ATTENUATION METER

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to DC attenuation measurements on system signal cables and attenuators, more particularly to a DC attenuation meter for making attenuation measurements in the field, and more particularly to a portable, hand-held meter to perform accurate DC attenuation measurements for electrical signal cables and signal attenuators.

The current procedure to perform DC attenuation measurements on system signal cables and attenuators is to take a known voltage and apply it to the input of the signal cable and measure the output to the diagnostic equipment and then calculate the attenuation factor. However, those working in the field did not generally have access to the necessary diagnostic equipment, and thus there has been a need for a system capable of performing accurate DC attenuation measurements when working in the field.

The present invention provides a solution to the above-referenced need by providing a portable, hand-held meter to measure DC attenuation in electrical signal cables and signal attenuators. In the meter of the invention, a DC voltage is applied to the signal input of the cable and feedback to the control circuit through the signal cable and attenuators. The control circuit adjusts the applied voltage to the cable until the feedback voltage equals the reference voltage. The "units" of applied voltage required at the cable input is the system attenuation value of the cable and attenuators.

SUMMARY OF THE INVENTION

It is an object of the present invention to accurately measure DC attenuation in the field.

A further object of the invention is to provide a direct current attenuation meter.

Another object of the invention is to perform accurate DC attenuation measurements on system signal cables and attenuators when working in the field.

Another object of the invention is to provide a portable, hand-held meter used to measure direct current (DC) attenuation in electrical signal cables and signal attenuators.

Other objects and advantages of the present invention will become apparent from the following description and accompanying drawing. The present involves a direct current (DC) attenuation meter. More specifically, the invention is directed to a portable, hand-held meter used to measure DC attenuation for use, for example, in calibrating data signal cables, attenuators and cable-attenuator assemblies. The invention is portable and hand-held, and thus particularly applicable for performing accurate DC attenuation measurements on system signal cables and attenuators when working in the field.

BRIEF DESCRIPTION OF THE DRAWING

The accompanying drawing, which is incorporated into and forms a part of the disclosure, illustrates an embodiment of the invention and, together with the description, serves to explain the principles of the invention.

The single FIGURE is a schematic illustration of an embodiment of the portable, hand-held DC attenuation meter of the present invention.

DETAILED DESCRIPTION OF THE INVENTION

The present invention is directed to a portable, hand-held meter to accurately measure DC attenuation in low impedance electrical signal cables and signal attenuators. The theory of operation of the meter is focused around the control loop, a reference voltage (Vref) and applied voltage (Vap), as described hereinafter with respect to the illustrated embodiment of the invention. The voltage reference is the "unit" of reference which is not required to be any specific voltage. A DC voltage (Vap) is applied to the signal input of the cable and feedback to the control circuit through the signal cable and attenuators. The control circuit adjusts the applied voltage (Vap) to the cable until the feedback voltage (Vfb) equals the reference voltage (Vref). The "units" of applied voltage (Vap) required at the cable input is the system attenuation value of the cable and attenuators. This is the feature that makes this meter or instrument unique.

The DC attenuation meter may be utilized to calibrate data signal cables, attenuators and cable-attenuator assemblies, as well as for any other application requiring accurate DC attenuation measurements.

Referring now to the drawing which schematically illustrates an embodiment of the DC attenuation meter connected to a cable-attenuator assembly. The attenuation meter is generally indicated at 10 and the cable-attenuator assembly is indicated generally at 11 and includes a cable 12 and an attenuator 13. The attenuation meter 10 includes a housing or container 14 within which is mounted a meter unit 15, a read/adjust switch 16, a voltage comparator 17, and a voltage source 18 which produces a reference voltage (Vref) 19. The source 18 is connected to a positive terminal of voltage comparator 17 via a lead 20 and to a unity adjust contact 21 of read/adjust switch 16 via a lead 22. A negative terminal of voltage comparator 17 is connected via a lead 23 which extends through an insulative grommet or pass-through 24 in housing 14 to attenuator 13, and the output of voltage comparator being connected via a lead 25 which extends through an insulative pass-through or grommet in housing 14 and is connected to a coupler 27 of cable 12. Meter unit 15 is connected by a lead 28 to a blade switch 29 of read/adjust switch 16 which is shown in contact with a read contact 30 which is connected via a lead 31, and which passes through an insulative grommet or pass-through 32 in housing 14, to a coupler 27 of cable 12. Meter unit 15 displays attenuation value of the unknown attenuation indicated at 33 between an end of cable 12 and an outer side of attenuator 13. When meter unit is connected via lead 28, blade switch 29 to reference voltage source 19 via unity adjust contact 21 and lead 20, the meter unit may be adjusted to read "1.000", when connected to the reference voltage (Vref) 19 as indicated by the meter unity adjust arrow 34. Arrow 35 indicates the applied voltage measured by meter unit 15, with arrow 36 indicating the applied voltage (Vap) from voltage comparator 17 of meter 10. Arrow 37 indicates the cable signal input, and arrow 38 indicates the cable signal output to diagnostic equipment as well as the voltage feedback (Vfb) to the voltage comparator 17 of the meter 10.

To measure the unknown attenuation of the cable-attenuator assembly 11 with the DC attenuation meter 10, the following steps are carried out:

1. Apply operating voltage to DC attenuation meter.
2. Connect Applied Voltage 26, to the input side of the Cable/Attenuator assembly 36.
3. Connect Applied Voltage monitor (measured by Meter) 32, to input side of the Cable/Attenuator assembly 37.

4. Connect Applied Voltage monitor (measured by Meter) 32, to input side of the Cable/Attenuator assembly 37.

5. Place Read/Unity Adjust switch 16, to the Unity Adjust position 21.

6. Adjust Meter Unity Adjust 34, unit METER 15, displays 1.0000.

7. Place Read/Unity Adjust switch 16, to the Read position 30.

8. The METER 15, will display the DC attenuation of the cable/attenuator assembly 11.

Another feature of this invention is that the cables used in connecting Applied Voltage 26, to the input side of the Cable/Attenuator assembly 36, Applied Voltage monitor (measured by Meter) 32, to input side of the Cable/Attenuator assembly 37, and Applied Voltage monitor (measured by Meter) 32, to input side of the Cable/Attenuator assembly 37, are automatically compensated for allowing the use of cable with different lengths.

It has thus been shown that the present invention provides a solution to the prior problems associated with DC attenuation measurements, particular when such measurements are needed in the field. The invention provides a portable, hand-held meter for use in accurate measurements of DC attenuation in low impedance electrical signal cables and signal attenuators.

While a specific embodiment of a DC attentuation meter has been illustrated and described to exemplify and teach the principles of the invention, such are not intended to be limited. Modifications and changes may become apparent to those skilled in the art, and it is intended that invention be not limited except via the scope of the appended claims.

What is claimed is:

1. A portable, hand-held meter for measuring direct current (DC) attenuation in a cable-attenuator assembly, comprising:

a housing, a meter unit for displaying attenuation value located within said housing, a voltage comparator located with said housing, a read/adjust switch located within said housing, said meter unit being operatively connected to said read/adjust switch, means for applying a reference voltage to said voltage comparator and said read/adjust switch, said meter unit and said voltage comparator being adapted to be operatively connected to an associated cable-attenuator assembly for measuring direct current attenuation therein, wherein said voltage comparator is adapted to apply an output thereof as an applied voltage to first end of said cable attenuator assembly, and receive a feedback voltage from a second end of the cable attenuator assembly to compare with said reference voltage, so as to produce a control circuit which adjusts the applied voltage until the feedback voltage equals the reference voltage, and wherein said meter unit is adapted to read the reference voltage when the read/adjust switch is in an adjust position, and read the applied voltage at the first end of the cable attenuator assembly when the read/adjust switch is in a read position, said meter unit being adjustable to unity with respect to the reference voltage when the read/adjust switch is in the adjust position.

2. The portable hand-held meter of claim 1, wherein said housing includes a plurality of grommets therein, whereby electrical leads from said meter unit and said voltage comparator extend through said plurality of grommets for operative connection to such an associated cable-attenuator assembly.

3. The portable, hand-held meter of claim 1, wherein said grommets form insulative pastthroughs for said leads.

4. The portable, hand-held meter of claim 1, wherein said read/adjust switch includes a movable blade, a read contact, and an adjust contact, said meter unit being operatively connected to said movable blade and adapted to move so as to contact said adjust contact for connection to said means for applying a reference voltage, and adapted to move so as to contact said read contact adapted to be operatively connected to such an associate cable-attenuator assembly.

5. A method for measuring DC attenuation in electrical signal cables and signal attenuators, comprising:

providing a portable, hand-held meter having a reference voltage and a feedback voltage, attaching the reference voltage and feedback voltage to opposite ends of an associated cable-attenuator, applying a voltage to the associated cable-attenuator at the end to which the reference voltage is attached, adjusting the applied voltage until the feedback voltage equals the reference voltage, determining units of applied voltage required to be applied so that the feedback voltage equals the reference voltage, with the units of applied voltage determining the attenuation value, and observing the displayed attenuation value on a meter unit.

6. In a method for obtaining DC attenuation measurements, the improvement comprising:

connecting a reference voltage and a feedback voltage to opposite ends of a component being measured, applying a voltage to the component at the end to which the reference voltage is connected, until the feedback voltage equals the reference voltage, and determining the attenuation value by the amount of applied voltage required to equal the feedback and reference voltages.

7. A portable, hand-held meter for measuring direct current (DC) attenuation in a cable-attenuator assembly, comprising:

a housing, a meter unit for displaying attenuation value located within said housing, a voltage comparator located with said housing, a read/adjust switch located within said housing, said meter unit being operatively connected to said read/adjust switch, means for applying a reference voltage to said voltage comparator and said read/adjust switch, said meter unit and said voltage comparator being adapted to be operatively connected to an associated cable-attenuator assembly for measuring direct current attenuation therein, and said read/adjust switch including a movable blade, a read contact, and an adjust contact, said meter unit being operatively connected to said movable blade and adapted to move so as to contact said adjust contact for connection to said means for applying a reference voltage, and adapted to move so as to contact said read contact adapted to be operatively connected to such an associate cable-attenuator assembly.

* * * * *